United States Patent
Sano et al.

[11] Patent Number: 5,785,302
[45] Date of Patent: Jul. 28, 1998

[54] HYDRO-PNEUMATIC SUSPENSION

[75] Inventors: Katsuyuki Sano, Toyota; Yukihide Kimura, Susono; Kimitoshi Kato, Kariya; Hiroyuki Terada, Aichi-ken, all of Japan

[73] Assignee: Toyota Jidosha Kabushiki Kaisha, Toyota, Japan

[21] Appl. No.: 761,559

[22] Filed: Dec. 6, 1996

Related U.S. Application Data

[63] Continuation of Ser. No. 340,883, Nov. 15, 1994, abandoned.

[30] Foreign Application Priority Data

Nov. 19, 1993 [JP] Japan .................. 5-314079

[51] Int. Cl.⁶ .............................. B60G 5/12
[52] U.S. Cl. ........................ 267/64.17; 267/64.19
[58] Field of Search .................. 267/64.16–64.19, 267/64.25, 218; 188/314, 315, 318, 319, 322.13, 322.21; 364/424.05; 280/6.11, 6.12, 708, 714, 840

[56] References Cited

U.S. PATENT DOCUMENTS

| | | | |
|---|---|---|---|
| 3,250,526 | 5/1966 | Kress | 267/64.16 |
| 3,497,199 | 2/1970 | Tuczek | 267/64.17 |
| 3,547,465 | 12/1970 | Hoffman et al. | 267/64.19 |
| 3,567,244 | 3/1971 | Hoffman et al. | 267/64.16 |
| 4,214,775 | 7/1980 | Taft | 280/708 |
| 4,325,567 | 4/1982 | Hendrickson | 267/64.17 |
| 4,368,878 | 1/1983 | Meller et al. | 267/64.17 |
| 4,408,773 | 10/1983 | Meller et al. | 267/64.17 |
| 4,577,840 | 3/1986 | Meller et al. | |
| 4,993,693 | 2/1991 | Löhr et al. | |
| 5,062,616 | 11/1991 | Sommer | |

FOREIGN PATENT DOCUMENTS

| | | | |
|---|---|---|---|
| 0 040 675 A2 | 3/1981 | European Pat. Off. | |
| 70 44591 | 12/1970 | France | |
| 2060157 | 12/1970 | Germany | 267/64.16 |
| 36 02 410 A1 | 1/1986 | Germany | |
| 2135422 | 8/1984 | United Kingdom | 267/64.17 |
| 2159235 | 11/1985 | United Kingdom | 267/64.17 |

OTHER PUBLICATIONS

"Self–Energizing Hydropneumatic Levelling Systems" (Meller), Society of Automotive Engineers, Technical Paper Series (1978).

*Primary Examiner*—Chris Schwartz
*Attorney, Agent, or Firm*—Oliff & Berridge, PLC

[57] ABSTRACT

A hydro-pneumatic suspension system adapted to be connected to first and second sides of a vehicle for leveling the vehicle in a side-to-side direction includes first and second absorbers, a pump and a gas spring element. Each of the first and second absorbers includes a piston rod provided with a piston for slidingly engaging a cylinder and an actuating chamber for an actuating liquid formed between the cylinder and the piston. The pump and the gas spring elements are connected to the actuating chamber of the first and second absorbers to control the flow of the actuating liquid. The pump and the gas spring element are independent from the first and second absorbers.

14 Claims, 9 Drawing Sheets

HYDRO-PNEUMATIC SUSPENSION

This is a Continuation of application Ser. No. 08/340,883 filed Nov. 15, 1994 now abandoned.

BACKGROUND OF THE INVENTION

1. Field of the Invention

The present invention relates to a hydro-pneumatic suspension having a leveling control for controlling a height of a vehicle at left and right wheels provided with a self-leveling absorber for controlling the level thereof by operation of a pump that contracts and expands according to the motion of the vehicle.

2. Description of the Prior Art

Figure 11:
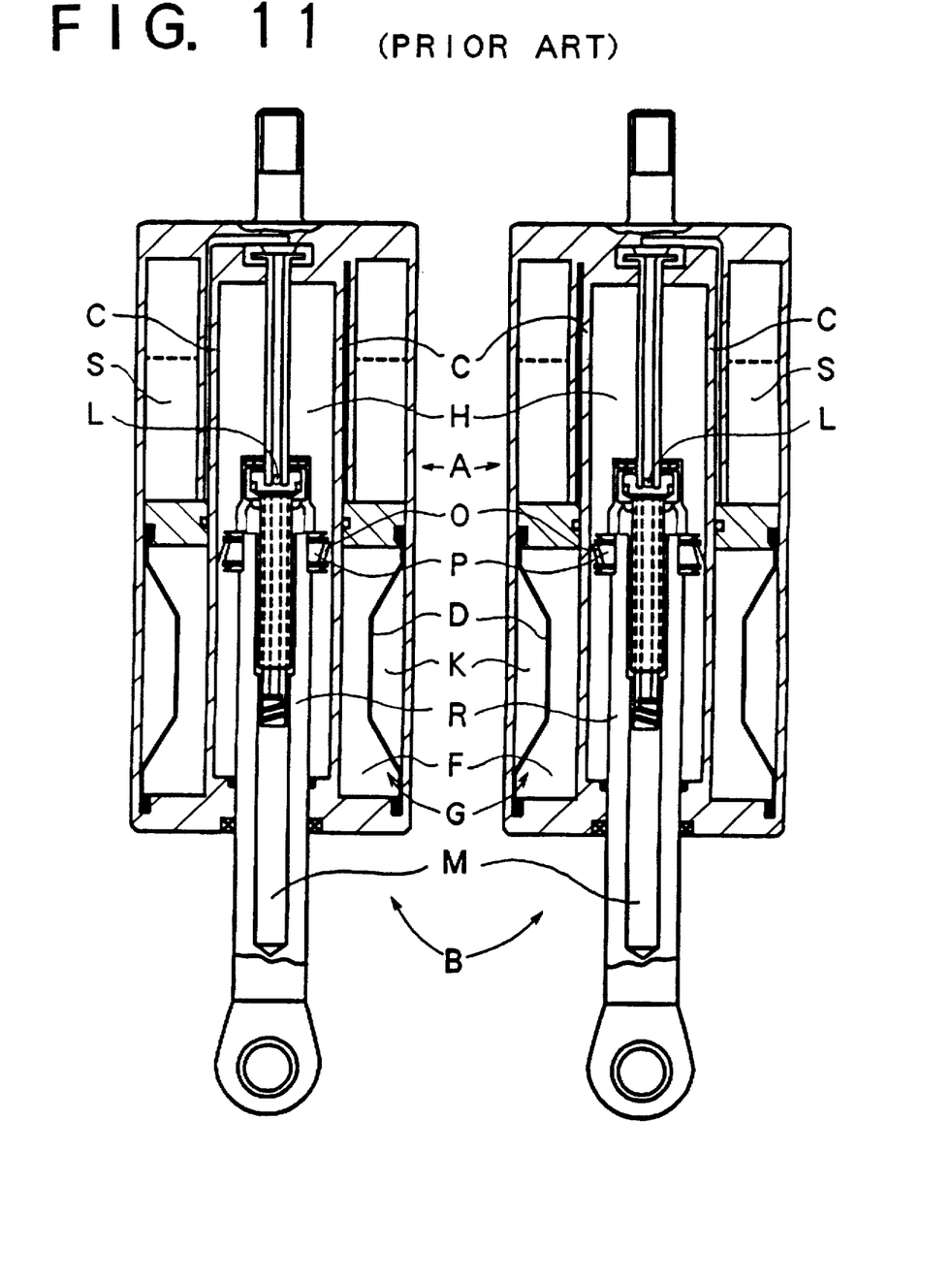
FIG. 11 is a sectional view showing a prior art example.

As shown in FIG. 11, a prior art hydro-pneumatic suspension comprises an absorber A adjacent each of the left and right wheels of the vehicle having an actuating chamber H defined by a piston P having a piston rod R that slidingly engages an orifice O of a cylinder C; a gas spring G comprising a gas chamber K and a liquid chamber F divided by a diaphragm D; and a self-leveling absorber having a leveling control mechanism B comprising a pump M for carrying out a pump operation by making use of a leveling change of the vehicle, (i.e., by changing the pressure within the cylinder C) a control opening L for determining an aimed leveling thereof and a reservoir S for holding a liquid, the suspension controlling the leveling of the vehicle with respect to the left and right wheels independently from each other.

Since the hydro-pneumatic suspension of the prior art described above controls the leveling of the vehicle with respect to the left and right wheels independently of each other by the leveling control mechanism B and others, there was the disadvantage that in the case that there is any difference in the road conditions of the left and right wheels, a difference in pump operation is produced between the pumps described above and a difference in controlling time of leveling is generated, resulting in inclination of the vehicle and decreasing the running stability thereof.

SUMMARY OF THE INVENTION

It is a general object of this invention to prevent the generation of any difference in the controlling time of leveling in left and right wheels and to avoid the inclination of vehicles and the decreasing of the running stability thereof.

It is a more specific object of the invention to provide a hydro-pneumatic suspension based on a technical idea of the invention to provide at least one of the components of the leveling control system, e.g., pumps, gas springs, control openings and reservoirs, respectively provided at left and right wheels, as a common component so as to uniformly control the leveling with respect to the left and right wheels.

It is another object of the invention to provide a hydro-pneumatic suspension comprising cylinders engaged with at least one of a vehicle body or wheels; piston rods provided with a piston having an orifice inserted into the cylinder, and engaged with the other of the vehicle body or the wheels; absorbers having an actuating chamber formed between the cylinder and piston and filled with a liquid; the absorbers being connected to the left and right wheels of a vehicle; and left and right leveling control mechanisms associated with the left and right wheels of the vehicle and which comprise pump means for carrying out pump operations by making use of a level change, control openings at predetermined points for controlling the leveling, and gas spring means having a gas chamber and a liquid chamber connected to the actuating chamber of the absorber divided by a diaphragm of the absorber wherein at least one of the pump means, the control openings and gas spring means, comprises a common means for providing the same operation to the left and right leveling control mechanisms.

It is still another object of the invention to provide a hydro-pneumatic suspension in which the cylinder is inserted into an external cylinder engaged with at least one of the vehicle body or wheels.

It is a further object of the invention to provide a hydro-pneumatic suspension in which the pump means comprise a pump associated with at least one of the absorbers of the left and right wheels.

It is a still further object of the invention to provide a hydro-pneumatic suspension in which the pump means comprise a pump provided independently from the left and right absorbers.

It is another object of the invention to provide a hydro-pneumatic suspension in which the gas spring means comprise a gas spring provided independently from the left and right absorbers.

A further object of the invention is to provide a hydro-pneumatic suspension in which the control opening means comprise a control opening provided independently from the left and right absorbers.

A still further object of the invention is to provide a hydro-pneumatic suspension in which the reservoir means comprises a reservoir provided independently from the left and right absorbers.

A hydro-pneumatic suspension of the invention provides the operation of the common one component according to at least one of the pump, a control opening, a reservoir, and a gas spring, to the left and right absorbers.

A hydro-pneumatic suspension of the invention provides a liquid due to the pump operation of the pump arranged in at least one of the left and right wheels, and composed of the leveling control mechanism to the left and right absorbers.

A hydro-pneumatic suspension of the invention provides a liquid due to the pump operation of the pump arranged independently from the left and right absorbers to the left and right absorbers.

A hydro-pneumatic suspension of the invention also provides an operation due to the gas spring arranged independently from the left and right absorbers and composed of the leveling control mechanism to the left and right absorbers.

Furthermore, a hydro-pneumatic suspension of the invention provides respectively operations due to the pump and gas spring arranged independently from the left and right absorbers and composed of the leveling control mechanism to the left and right absorbers.

Still furthermore, a hydro-pneumatic suspension of the invention provides respectively operations due to the pump, gas spring and control opening arranged independently from the left and right absorbers and composed of the leveling control mechanism to the left and right absorbers.

Furthermore, a hydro-pneumatic suspension of the invention provides respectively operations due to the pump, gas spring, control opening, and reservoir arranged independently from the left and right absorbers and composed of the leveling control mechanism to the left and right absorbers.

A hydro-pneumatic suspension of the invention having the above operation attains an effect of uniformly leveling the left and right wheels by providing same operation of the common one component according to at least one of the pumps, control openings, reservoirs, and gas springs composed of the leveling control mechanisms on the left and right absorbers.

A hydro-pneumatic suspension of the invention having the above operation attains an effect of uniformly leveling the left and right wheels by supplying a liquid to the left and right absorbers by means of the common one pump arranged to at least one of the left and right wheels composed of the leveling control mechanism.

A hydro-pneumatic suspension of the invention having the above operation attains an effect of uniformly leveling the left and right wheels by supplying a liquid to the left and right absorbers by means of one pump arranged independently from the left and right absorbers composed of the leveling control mechanism.

A hydro-pneumatic suspension of the invention having the above operation attains an effect of uniform leveling of the left and right wheels possible by the operation due to the common one gas spring arranged independently from the left and right wheels composed of the leveling control mechanism on the left and right absorbers.

A hydro-pneumatic suspension of the invention having the above operation also attains an effect of making uniform leveling of the left and right wheels more possible by the operations due to the common pump and gas spring arranged independently from the left and right absorbers.

Furthermore, a hydro-pneumatic suspension of the invention having the above operation attains an effect of making the uniform leveling of the left and right wheels more possible by the operation due to the common one control opening in addition to the above feature of the invention arranged independently from the left and right absorbers.

Still furthermore, a hydro-pneumatic suspension of the invention having the above operation attains an effect of making the uniform leveling of the left and right wheels more possible by the same operation due to the one reservoir in addition to the above feature of the invention arranged independently from the left and right absorbers described above.

DETAILED DESCRIPTION OF PREFERRED EMBODIMENTS

Referring now to the attached drawings, the detailed description of several preferred embodiments will be given in the following.

A First Preferred Embodiment

Figure 1:
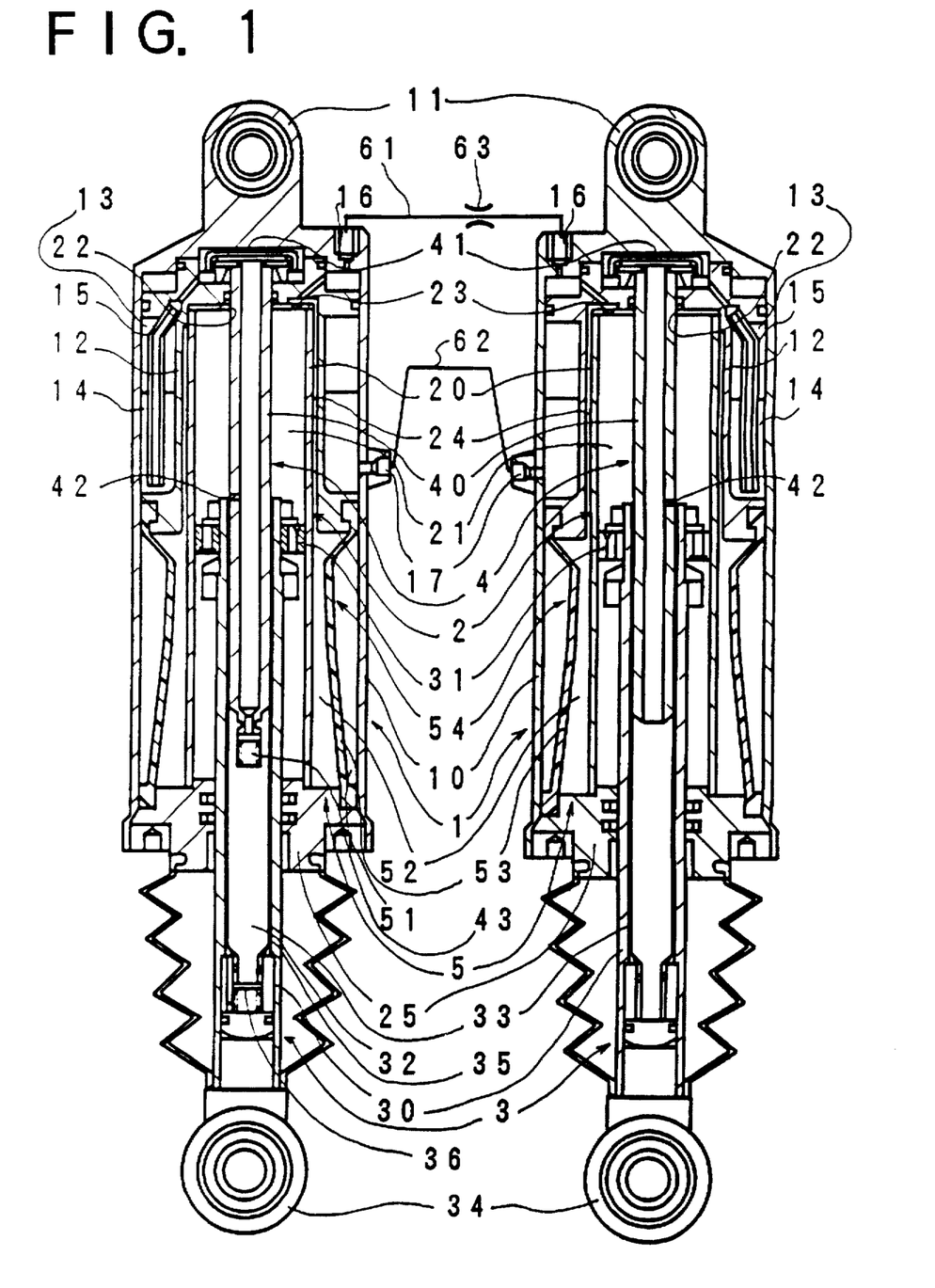
FIG. 1 is a sectional view showing a first preferred embodiment of the present invention.
Figure 2:
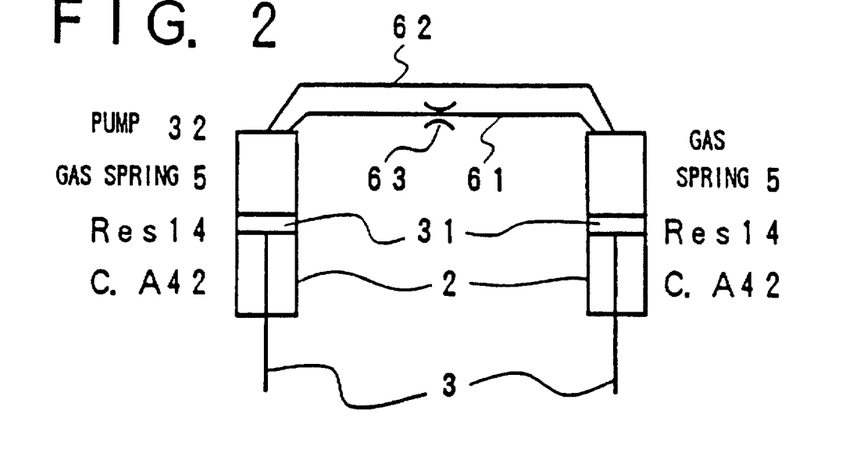
FIG. 2 is a schematic view showing an outline of the first preferred embodiment of the present invention.

A hydro-pneumatic suspension of the first preferred embodiment corresponds to the preferred embodiments of the invention and constitutes a leveling control mechanism comprising absorbers having: internal cylinders 2 positioned within external cylinders 1 engaged with the left and right sides of the vehicle body as shown in FIGS. 1 and 2, piston rods 3 having pistons 31 slidingly engaged within the internal cylinders 2 and connected with a member associated with the wheels, pump rods 4 having control openings 42 positioned at a predetermined point, a pump 32 engaged with the external cylinder 1 of one absorber at its one end and inserted in the piston rod 3 for carrying out a pump operation by making use of the leveling change. The absorbers also include an actuating chamber 21 formed between the cylinder 2 and the piston 31 and filled with a liquid, a reservoir 14 reserving a liquid to be supplied to the pump 32, a gas spring 5 having a gas chamber 51 and a liquid chamber 52 divided by a diaphragm 53, the liquid chamber communicating with the actuating chamber 21, a high pressure communicating oil passage for connecting the left and right actuating chambers 21 with each other and a low pressure connecting oil passage for communicating the left and right reservoirs 14 with each other.

The external cylinder 1 comprises a hollow cylindrical body 10 having a bottom portion, an engaging portion 11 connecting to the vehicle body at the upper end of the bottom portion, an inserted member 12 having a U-shaped vertical section inserted into the bottom portion, a low pressure chamber 13 formed between an inner wall thereof and the inserted member 12, an oil reservoir 14 formed in the lower portion of this low pressure chamber 13, a communicating pipe 15 provided in the oil reservoir 14, a high pressure port 16 formed in the shoulder portion thereof, the high pressure part 16 communicating to the high pressure communicating oil passage 61, and a low pressure port 17 formed on the side wall thereof, the low pressure port 17 communicating to the low pressure communicating passage 62.

The cylinder 2 comprises a hollow cylindrical body 20 in which an actuating chamber 21 is internally formed and the inserted member 12 is inserted into the bottom portion of the external cylinder 1 while providing the bottom portion of the inserted member upwards, a hole portion 22 for inserting a pump rod 4 and an opening 23 for connecting the actuating chamber 21 and the liquid chamber 52 of the gas spring 5 to one another formed at the center of the bottom portion, an oil passage 24 communicating to the liquid chamber 52 formed between an external wall thereof and the internal wall of the inserted member 12, and at the lower end, an annular plug 25 arranged between a lower end of the external cylinder 1 and the lower end thereof, respectively.

The piston rod 3 comprises a hollow cylindrical body 30 of small diameter for penetrating through the plug 25 and comprising the pump 32 therein, an engaging portion 34 for engaging with the member supporting the wheels formed at the lower end thereof, a piston 31 having an orifice as a damping valve fixed to its upper end, a control sleeve 33 composed of a thin hollow cylindrical body of small diameter inserted therein, an outlet valve 36 deenergized upwards in the FIG. 1 by a spring at the lower end of the control sleeve 33 provided in the piston rod 3 on one side absorber (shown on the left side in FIG. 1), and an oil passage 35 for connecting the pump 32 and the actuating chamber 21 formed between the external wall of the control sleeve 33 and the internal wall of the piston rod 3.

The pump rod 4 comprises a hollow cylindrical body of small diameter 40, the upper end of which is engaged with the bottom portion of the external cylinder 1 through a cushion, a control opening 42 for determining the aimed leveling to be controlled by connecting the inner and outer circumferencial walls is formed at the roughly center in a longitudinal direction thereof, an inlet valve 43 deenergized by a spring upwards in the figure and connected to the pump 32 arranged at the lower end and a pump 32 formed by the outlet valve 36 in the absorber shown on left side in FIG. 1, an inner passage thereof being connected to the oil reservoir 14 through the cushion 41 and the communicating pipe 15.

The pump 32 is formed in the piston rod 3 inserted with the pump rod 4 in the absorber shown on the left side in FIG. 1. The inlet valve 43 formed in the pump rod 4 is connected to the low pressure chamber 13 and to the chamber of the pump 32. The outlet valve 36 formed in the piston rod 3 described above is connected to the pump 32 and to the actuating chamber 21 and the gas spring 5.

Therefore, when the absorber is contracted, an oil is supplied from the chamber constituting the pump 32 to the actuating chamber 21 through the outlet valve 36, and reversely, when the absorber is expanded, the oil is supplied from an oil reservoir 14 to the pump 32 through the inlet valve 43 described above.

The diaphragm 53 comprises a membrane such as a rubber or the like, engaged airtightly with a flange portion of the inserted member 12 arranged in the external cylinder 1 and the upper end of the plug 25, respectively, and defines a gas chamber 51 charged with nitrogen gas and the liquid chamber 52 connecting to the actuating chamber 21 through the oil passage 24, resulting in a cylindrical gas spring 5.

The low pressure communicating oil passage 62 connects the oil reservoirs 14 of the left and right absorbers shown in FIG. 1 with each other and makes an oil flow between the left and right oil reservoirs 14 possible.

The high pressure communicating oil passage 61 connects the actuating chambers 21 of the left and right absorbers shown in FIG. 1 with each other, and oil urged by the pump 32 in the left and right absorbers is supplied to the actuating chambers 21 of the left and right absorbers not equipped with the pump 32 through the orifice 63, thereby allowing similar leveling of the left and right absorbers. The low pressure communicating oil passage 62 and the high pressure communicating oil passage 61 do not communicate with each other.

In a hydro-pneumatic suspension of the first preferred embodiment having the above construction, the pump rod 4 moves relatively upwards in the case that the absorber is expanded, and therefore, the oil in the oil reservoir 14 described above enters the pump rod 4 described above through the communicating pipe 15 and the cushion 41 and flows into the pump 32 through the inlet valve 43. Once the control opening 42 formed at approximately the center of the pump rod 4 by pushing down the piston 31 is exposed to the actuating chamber 21, the oil in the actuating chamber 21 flows into the pump rod 4 through this control opening 42 and then the oil reservoir 14 through the cushion 41 and the communicating pipe 15, and therefore, the pressure in the actuating chamber 21 is lowered, resulting in restricting the height of the absorber therein.

On contrary to the above description, in the case that the absorber is contracted, when the oil pressure in the pump 32 is increased and exceeds a predetermined value, the oil overcomes the deenergized force of the spring in the outlet valve 36, flows out of the pump chamber 32 and flows into the actuating chamber 21 described above through an oil passage 35 formed between the control sleeve 33 and the piston rod 3, resulting in increasing the pressure in the actuating chamber 21. As described above, once the oil is supplied from the pump 32 to the actuating chamber 21 on the left, the oil is supplied to the absorber on the right through the high pressure communicating oil passage 61 and the pressure of the actuating chamber 21 is elevated.

When the pressure in the actuating chamber 21 decreases, the oil suction pressure in the liquid chamber 52 composed of the oil chamber communicating with actuating chamber 21 through the opening 23 and the oil passage 24 correspondingly increases. Therefore, the diaphragm 53 arranged between the gas chamber 51 and the liquid chamber expands in a radial direction thereof, resulting in making the volume change of the gas spring 5 possible.

Since the leveling of the left and right absorbers is controlled by the pump 32 formed in the absorber on the left side, a hydro-pneumatic suspension of the first preferred embodiment having the above operation attains an effect of preventing the inclination of the vehicle and the decreasing of the running stability by preventing any difference between the left and right levelings or heights of the vehicle and by preventing the generation of difference in controlling time between the left and right levelings thereof, even though any difference may be produced between the left and right road surface conditions.

A Second Preferred Embodiment

Figure 3:
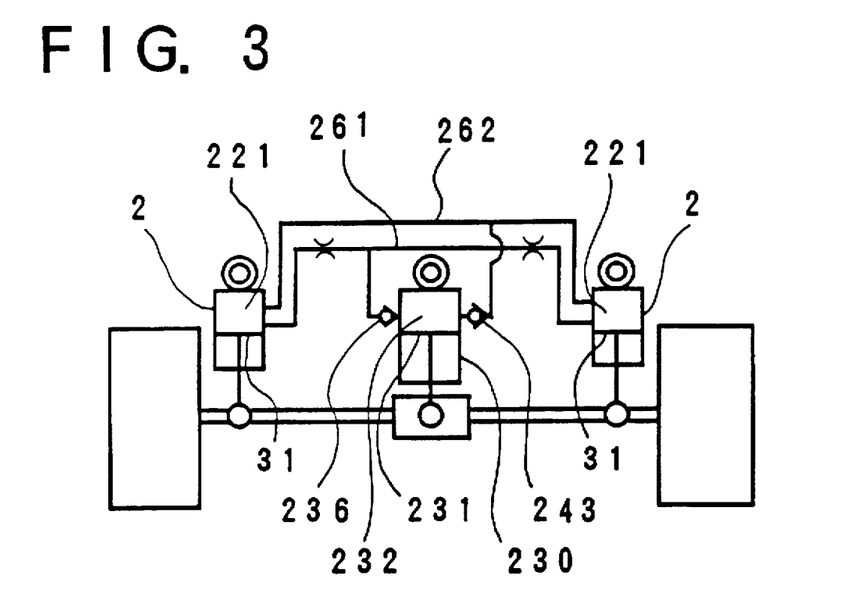
FIG. 3 is a schematic view showing an outline of a second preferred embodiment of the present invention.

Since a pump 232 is arranged between a differential gear or stabilizer arranged at the center of the rear axle and the lower portion of the vehicle body independently from the left and right absorbers as shown in FIG. 3, a hydro-pneumatic suspension of the second preferred embodiment comprises a cylinder 230 engaged with the the lower portion of the vehicle body and a piston 231 inserted in the cylinder 230 engaged with the differential gear. The aspects which are different from those of the first preferred embodiment comprise: a first check valve 236 for making it possible to supply the oil from the pump 232 when the interval between the rear axle and the vehicle body becomes narrow (i.e., when the absorbers are contracted), a second check valve 243 for making it possible to supply the oil to the pump 232 when conversely the interval between the rear axle and the vehicle body becomes wide (i.e., when the absorbers are expanded), a high pressure communicating oil passage 261 for connecting the first check valve 236 with the actuating chamber 21 of the left and right absorbers through an orifice, and a low pressure communicating oil passage 262 for connecting the second check valve 243 described above with the oil reservoir 14 in the external cylinder, and the explanations about the other portions are omitted because of their similar constitutions.

Since the leveling is thereby controlled by supplying the oil to the actuating chamber 221 of the left and right absorbers by means of the pump 232 formed at the center of the vehicle body independently from the left absorber, a hydro-pneumatic suspension of the second preferred embodiment prevents the inclination of the vehicle and the decreasing of the running stability thereof by preventing the generation of the difference between the left and right levelings and by preventing the generation of any difference in controlling time of the left and right levelings even though a difference may be produced in the left and right road surface conditions.

A Third Preferred Embodiment

Figure 4:
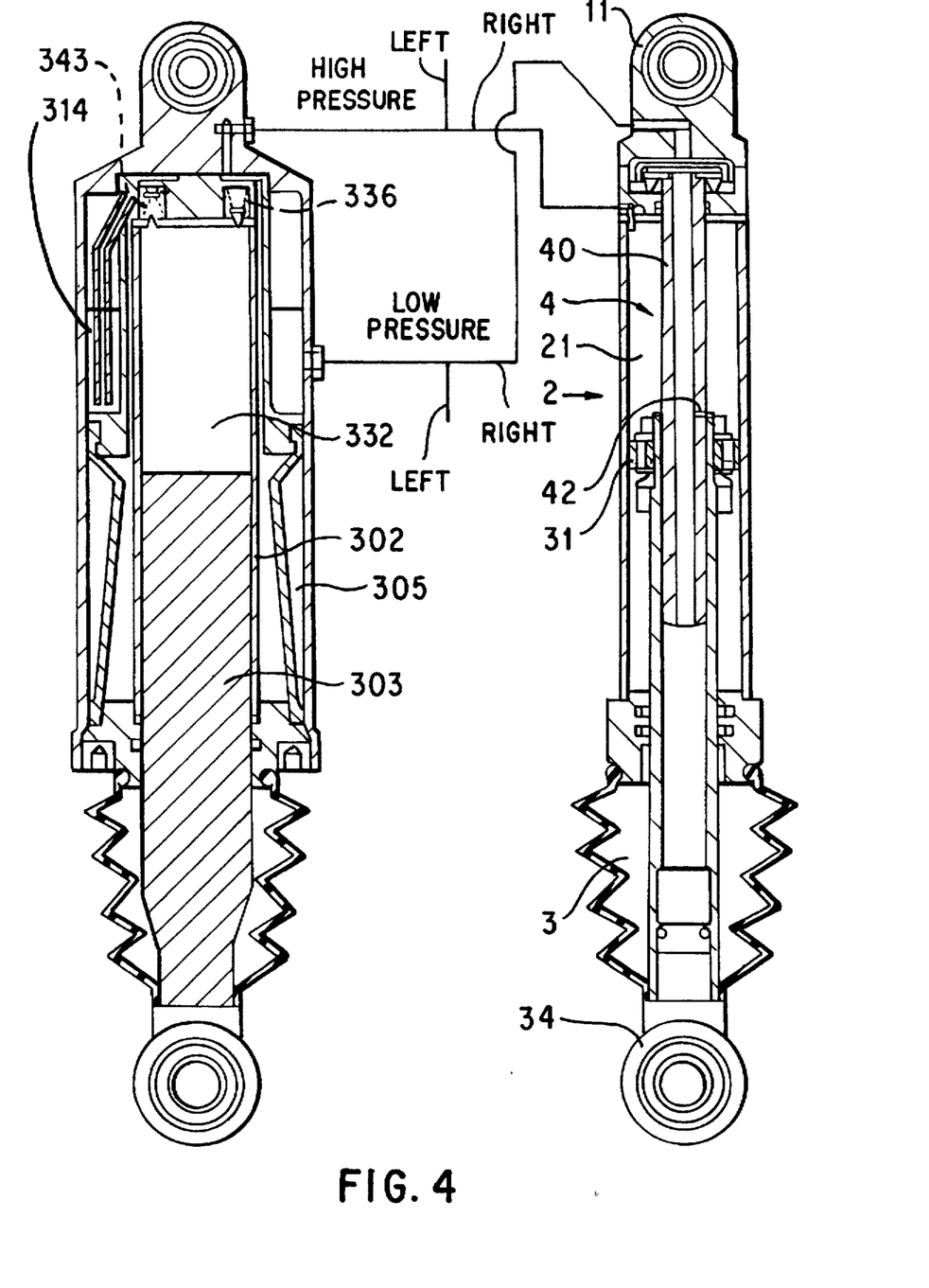
FIG. 4 is a sectional view showing a third preferred embodiment of the present invention.
Figure 5:
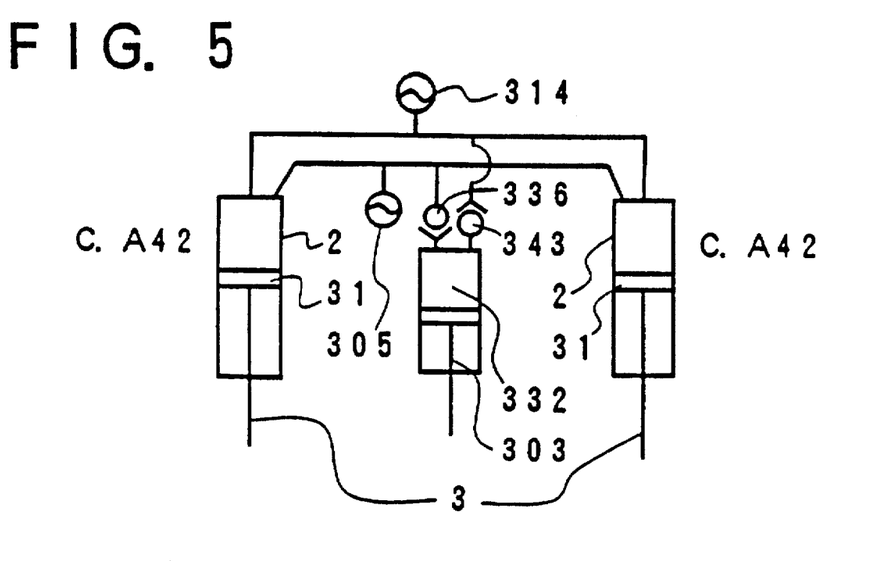
FIG. 5 is a schematic view showing an outline of the third preferred embodiment of the present invention.

A hydro-pneumatic suspension of the third embodiment is different from that of the first and second preferred embodiments in the following aspects: the left and right absorbers (only the right absorber is shown in FIG. 4) are arranged by removing the external cylinder 1 of the left and right absorbers of the first preferred embodiment; the action as a pump rod is given by making the diameter of the piston rod 303 of the leveling control mechanism independently arranged at the center in the width direction of the vehicle body virtually equal to that of the cylinder 302 to form a pump 332 for being capable of supplying the oil to the left and right absorbers at the upper portion thereof; a first check valve 336 is formed for connecting to the actuating chamber 21 of the left and right absorbers described above at the shoulder of the cylinder 302; a second check valve 343 is formed for connecting to an oil reservoir 314 formed in this leveling control mechanism; and the similar gas spring 305 to that of the first preferred embodiment. Further explanations about the other portions are omitted because of their similar constitutions.

The hydro-pneumatic suspension of the third preferred embodiment prevents the inclination of the vehicle and the decrease in running stability more effectively by preventing the generation of any difference in the left and right levelings and by preventing the generation of any difference in the controlling time of the left and right levelings even though any difference may be produced in the left and right road surface conditions, since this hydro-pneumatic suspension supplies the supplied oil from oil reservoir 314 in the leveling control mechanism formed at the center of the vehicle body independently from the left absorber to the left and right absorbers and the action of the gas spring 305 formed in this leveling control mechanism to control the leveling.

The hydro-pneumatic suspension of the third preferred embodiment results in a simpler structure that can be produced at less cost because only a single gas spring 305 having a high pressure chamber is required. By making the leveling control times of the left and right wheels equal to each other, the independent gas spring 305 allows the hydro-pneumatic suspension to control the left and right absorbers.

A Fourth Preferred Embodiment

Figure 6:
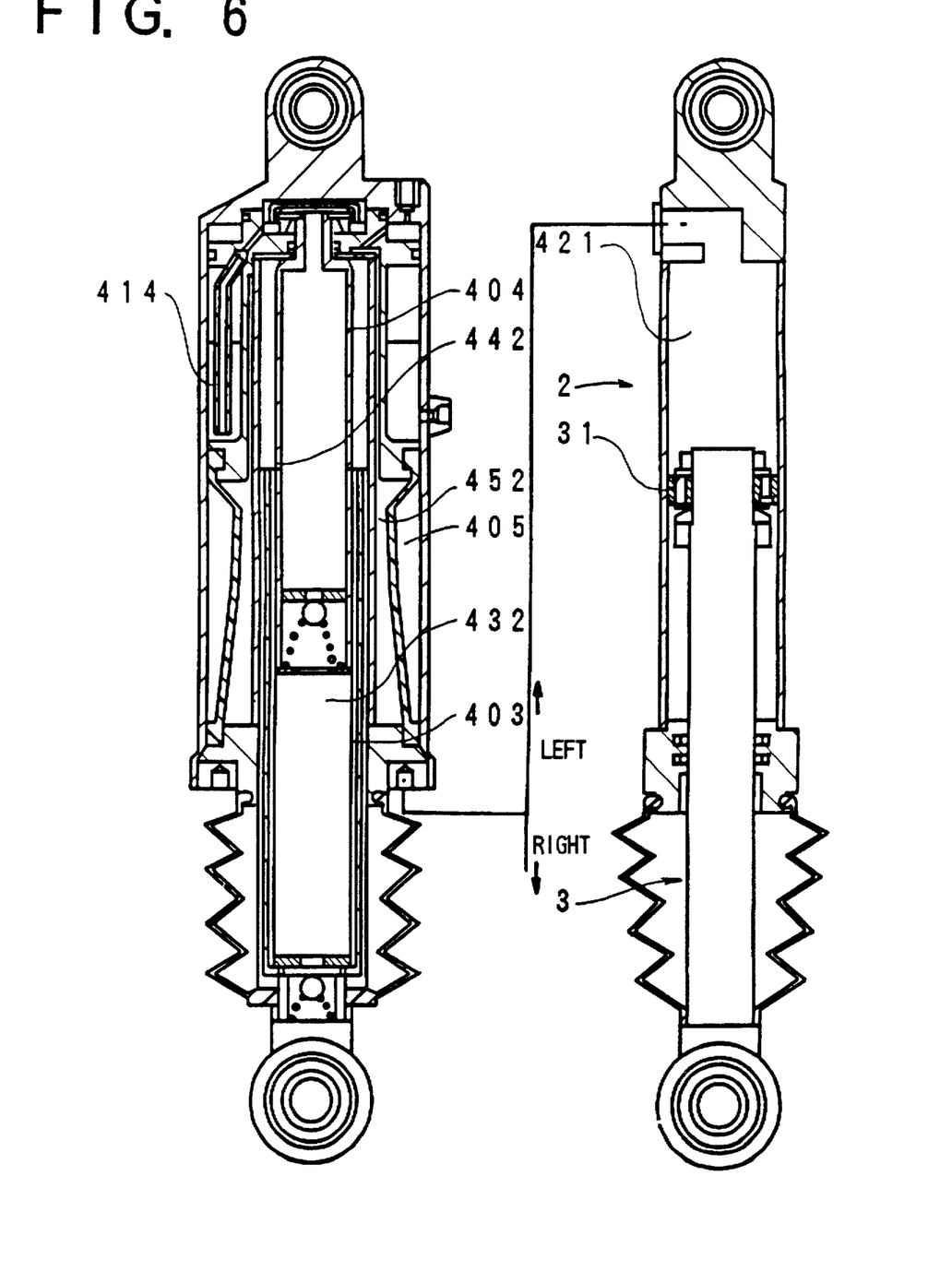
FIG. 6 is a sectional view showing a fourth preferred embodiment of the present invention.
Figure 7:
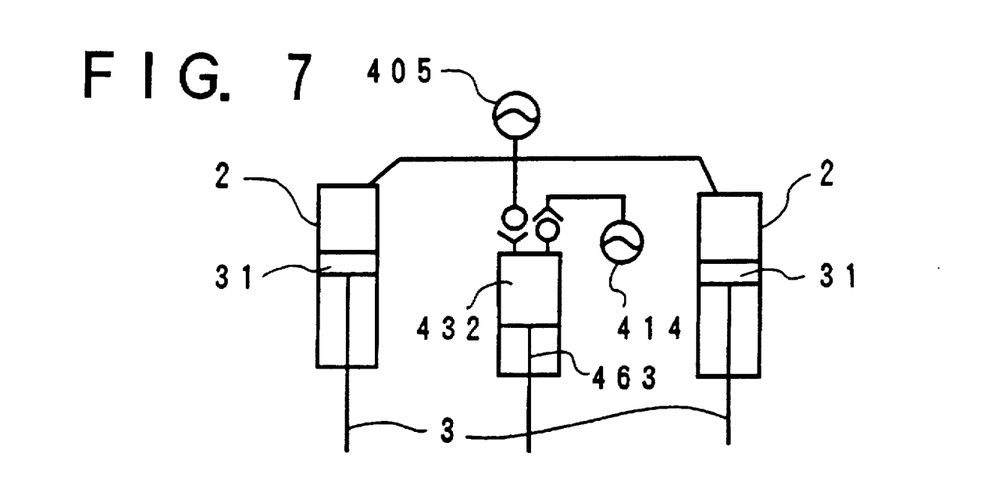
FIG. 7 is a schematic view showing the fourth preferred embodiment of the present invention.

A hydro-pneumatic suspension of the fourth preferred embodiment is different from that of the third preferred embodiment described above in the following aspects: the control opening of the left and right absorbers in the third preferred embodiment above as shown in FIGS. 6 and 7 are removed; the piston rod 403 of the leveling control mechanism independently arranged at the center in the cross direction of the vehicle body is composed of a hollow cylindrical body of the virtually same diameter with the inner diameter of the cylinder 402; a pump 432 for making it possible to supply the oil to the left and right absorbers comprising the similar basic constitution with that of the first preferred embodiment described above by inserting a pump rod 404 of a large diameter fixed to the bottom portion of the cylinder 402 at one end thereof into the piston rod 403 described above; a control opening 442 for determining an aimed leveling to the pump rod 404 described above; and a liquid chamber 452 of a gas spring 405 is connected to an actuating chamber 421 of the left and right absorbers through a high pressure port. Further explanations about the other portions are omitted because of their similar constitutions.

The hydro-pneumatic suspension of the fourth preferred embodiment prevents the inclination of the vehicle and the decrease in running stability more effectively by preventing the generation of the difference in the left and right levelings and by preventing the generation any difference in the controlling time of the left and right levelings even though any difference may be produced in the left and right road surface conditions, since this hydro-pneumatic suspension supplies the supplied oil from the oil reservoir 414 described above in the leveling control mechanism formed at the center of the vehicle body independently from the left and right absorbers to the left and right absorbers by a pump 432, effects the action of the gas spring 405 formed in this leveling control mechanism on the left and right absorbers, and adjusts at an aimed leveling on the basis of a control opening 442 formed in the pump rod 404 described above.

The hydro-pneumatic suspension of the fourth preferred embodiment results in a simpler structure that can be produced at less cost because only a single gas spring 405 having a high pressure chamber is required. By making the leveling control times of the left and right wheels equal to each other, the independent gas spring 405 allows the hydro-pneumatic suspension to control the left and right absorbers.

A Fifth Preferred Embodiment

Figure 8:
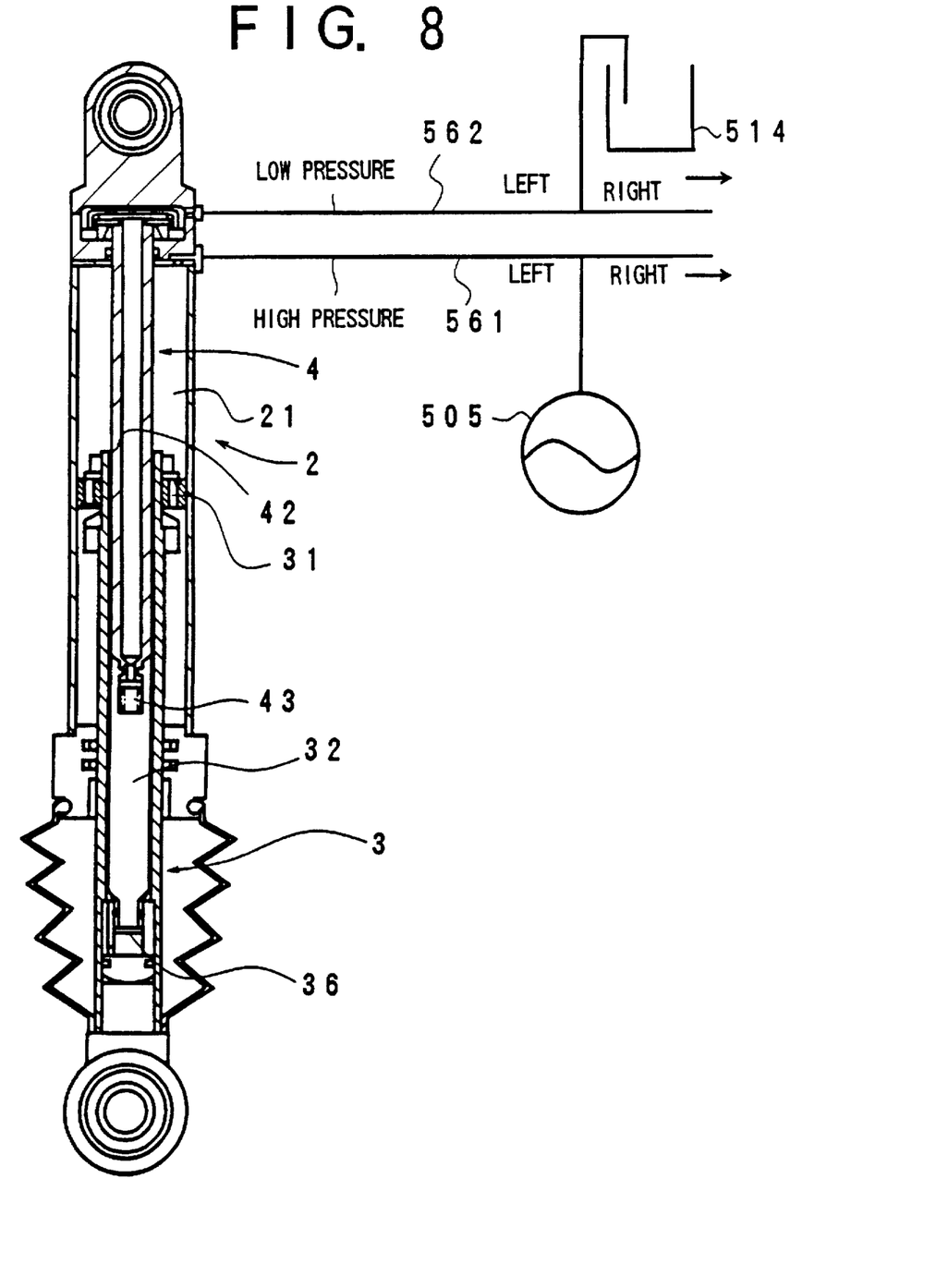
FIG. 8 is a sectional view showing a fifth preferred embodiment of the present invention.
Figure 9:
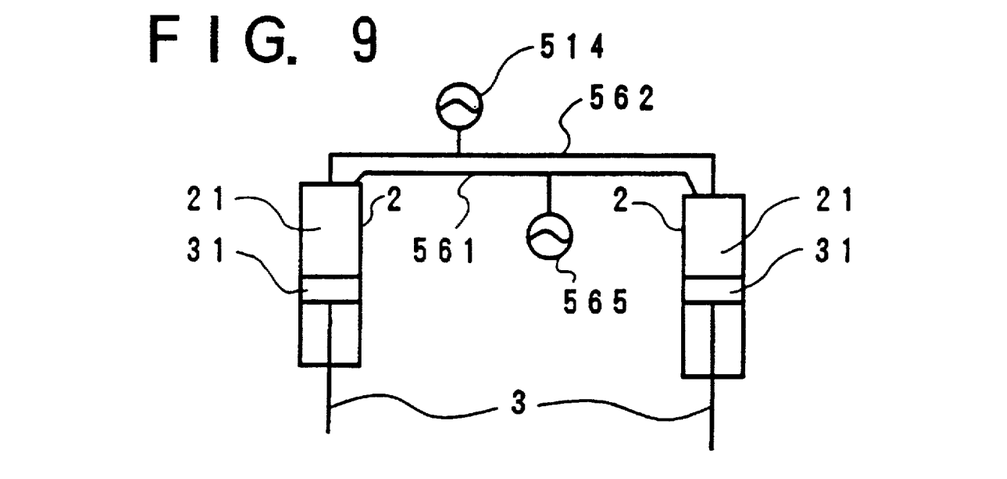
FIG. 9 is a schematic view showing an outline of the fifth preferred embodiment of the present invention.

A hydro-pneumatic suspension is different from that of the first preferred embodiment in the following aspects: the left and right absorbers (only the right absorber is shown in FIG. 8) are arranged by removing the external cylinder 1 of the left and right absorbers of the first preferred embodiment as shown in FIGS. 8 and 9; a gas spring 505 and an oil reservoir 514 are formed in a high pressure communicating oil passage 561 and a low pressure communicating oil passage 562 connected to the left and right absorbers described above independently from the left and right absorbers described above; and second check valve 343 is formed for connecting to an oil reservoir 314 formed in this leveling control mechanism. Further explanations about the other portions are omitted because of their similar constitutions.

The hydro-pneumatic suspension of the fifth preferred embodiment prevents the inclination of the vehicle and the decrease in running stability more effectively so as not to produce any difference in the left and right levelings by preventing the generation any difference in the controlling time of the left and right levelings even though any difference may be produced in the left and right road surface conditions, since this hydro-pneumatic suspension supplies the supplied oil from oil reservoir 514 described above in the leveling control mechanism formed at the center of the vehicle body independently from the left absorber to the left and right absorbers and the action of the gas spring 505 formed in this leveling control mechanism to control the leveling.

The hydro-pneumatic suspension of the fifth preferred embodiment results in a simpler structure that can be produced at less cost because only a single gas spring 505 having a high pressure chamber is required. By making the leveling control times of the left and right wheels equal to each other, the independent gas spring 505 allows the hydro-pneumatic suspension to control the left and right absorbers.

The preferred embodiments described above are illustrated for just explaining the present invention. It is to be understood that the present invention should not be limited by these preferred embodiments. Any alteration and addition may be possible so long as the scope of patent claims, detailed description of the invention and the drawings may not be opposed to the technical ideas of the present invention.

Figure 10:
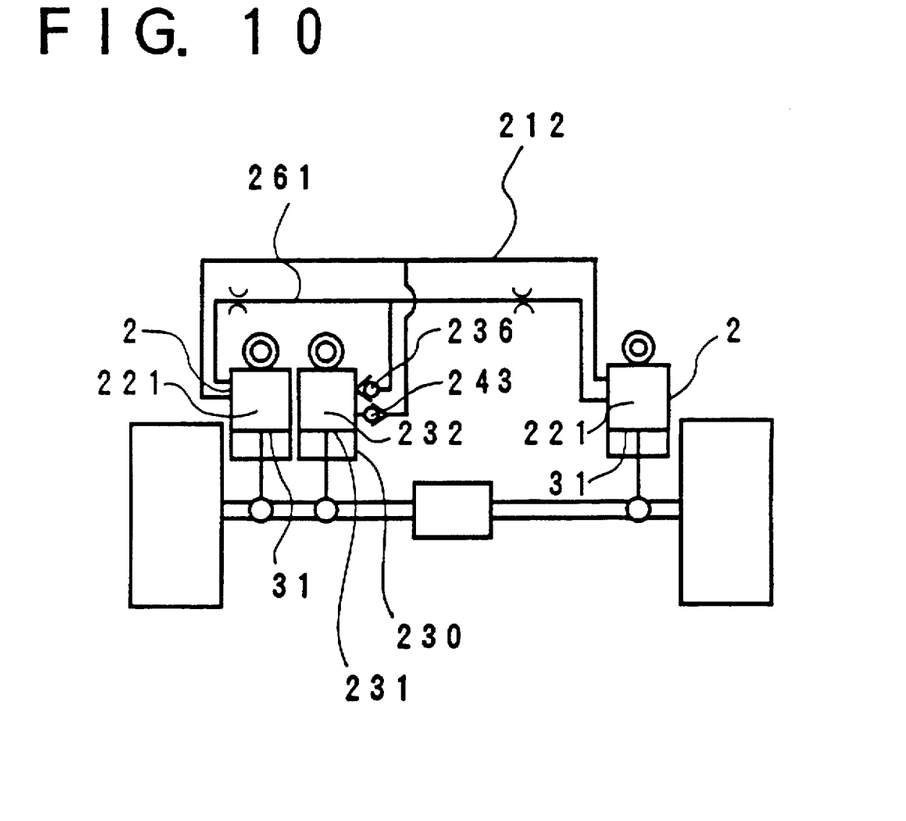
FIG. 10 is a schematic view showing an outline of alternative preferred mode of the present invention.

In the second preferred embodiment described above, there was a description about an example for inserting an independent pump between the deflector and the lower portion of the vehicle body. However, the present invention should not be so restricted. For instance, as shown in FIG. 10, such a mode as to insert the independent pump 232 between the rear axle and the lower portion of the vehicle body by positioning the independent pump 232 in proximity to one side absorber can be also adapted.

In the third through fifth preferred embodiments described above, an example was described in which each component of the leveling control mechanism is formed independently from the left and right absorbers, but the present invention should not be limited to these embodiments. As shown in the second preferred embodiment described above, such a mode as to form each component described above in one of the left and right absorbers can be also adapted.

In the third preferred embodiment described above, it is also possible to add the similar pump with that of the rear axle between the vehicle body and the member for supporting the wheels on the front wheel side, and it becomes possible to attain the savings of the leveling control time thereby.

What we claim is:

1. A hydro-pneumatic suspension system adapted to be connected to first and second sides of a vehicle having an axle for leveling the vehicle in a side-to-side direction, the system comprising:

first and second absorbers adapted to be connected between the respective first and second sides of the vehicle and respective first and second axle portions, each of the first and second absorbers including a piston rod provided with a piston for slidingly engaging a cylinder and an actuating chamber containing an actuating liquid formed between the cylinder and the piston;

pump means including a pump positioned between the first and second absorbers and adapted to be connected to the vehicle and the axle of the vehicle with the pump comprising a piston with a piston face slidingly engaged within an internal cylinder having a side wall and an end wall that together with the piston face define a pumping chamber;

reservoir means, the reservoir means and the pump means connected by respective first and second lines to the actuating chamber of each of the first and second absorbers for controlling the flow of the actuating liquid between the first and second absorbers to uniformly control leveling of the vehicle in the side-to-side direction and;

gas spring means comprising a liquid chamber defined between the internal cylinder and an external cylinder surrounding the internal cylinder and a diaphragm for separating a gas under pressure from the actuating liquid within said liquid chamber, wherein the pump means and gas spring means are distant and spaced apart from the first and second absorbers, and the first and second lines do not communicate with each other.

2. The hydro-pneumatic suspension system according to claim 1, wherein the first line is a high pressure liquid line connecting the pumping chamber of the pump to the actuating chamber of each of the first and second absorbers, the high pressure liquid line being in communication with a check valve for regulating flow of the actuating liquid under pressure; and the second line is a low pressure liquid line connecting the actuating chamber of each of the first and second absorbers with the reservoir means.

3. The hydro-pneumatic suspension system according to claim 2, further comprising:

a hollow rod formed integrally with the cylinder of each of the first and second absorbers and interposed within a bore of the piston of each absorber, the hollow rod having a rod chamber formed therein and an opening for allowing the actuating liquid to flow between the actuating chamber and the rod chamber.

4. The hydro-pneumatic suspension system according to claim 3, wherein the piston of each of the first and second absorbers has a piston face and the cylinder of each of the first and second absorbers has a side wall and an end wall that together with an outer surface of the hollow rod and the piston face define the actuating chamber for the actuating liquid.

5. The hydro-pneumatic suspension system according to claim 1, including a check valve wherein said check valve is positioned in a neck of the pump adjacent the pumping chamber.

6. The hydro-pneumatic suspension system according to claim 5, wherein the check valve is a first check valve and the low pressure line is in communication with a second check valve.

7. A hydro-pneumatic suspension system adapted to be connected to first and second sides of a vehicle having an axle for leveling the vehicle in a side-to-side direction, the system comprising:

first and second absorbers adapted to be connected between the respective first and second sides of the vehicle and respective first and second axle portions, each of the first and second absorbers including a piston rod provided with a piston for slidingly engaging a cylinder, and an actuating chamber containing an actuating liquid formed between the cylinder and the piston;

a pump device including a pump positioned between the first and second absorbers and adapted to be connected to the vehicle and the axle of the vehicle with the pump comprising a piston with a piston face slidingly engaged within an internal cylinder having a side wall and an end wall that together with the piston face define a pumping chamber;

an actuating liquid reservoir connected by respective first and second lines to the actuating chamber of each of the first and second absorbers for controlling the flow of the actuating liquid between the first and second absorbers to uniformly control leveling of the vehicle in the side-to-side direction; and a gas spring device including a liquid chamber defined between the internal cylinder and an external cylinder surrounding the internal cylinder and a diaphragm for separating a gas under pressure from the actuating liquid within said liquid chamber wherein the pump device and the gas spring device are distinct and spaced apart from the first and second absorbers and the first and second lines do not communicate with each other.

8. The hydro-pneumatic suspension system according to claim 7, further comprising:

a hollow rod formed integrally with the cylinder of each of the first and second absorbers and interposed within a bore of the piston of each absorber, the hollow rod having a rod chamber formed therein and an opening for allowing the actuating liquid to flow between the actuating chamber and the rod chamber.

9. The hydro-pneumatic suspension system according to claim 8, wherein the piston of each of the first and second absorbers has a piston face and the cylinder of each of the first and second absorbers has a side wall and an end wall that together with an outer surface of the hollow rod and the piston face define the actuating chamber for the actuating liquid.

10. The hydro-pneumatic suspension system according to claim 7, wherein the first line connecting the pump device to the actuating chamber of each of the first and second absorbers is a high pressure liquid line in communication with a check valve for regulating flow of the actuating liquid under pressure, and wherein the second line connecting the gas spring device to the actuating chamber of each of the first and second absorbers is a low pressure liquid line.

11. The hydro-pneumatic suspension system according to claim 7, wherein the check valve is positioned in a neck of the pump adjacent the pumping chamber.

12. The hydro-pneumatic suspension system according to claim 8, wherein the check valve is a first check valve and the low pressure line is in communication with a second check valve.

13. A hydro-pneumatic suspension system adapted to be connected to first and second sides of a vehicle for leveling the vehicle in a side-to-side direction, the system comprising:

first and second absorbers adapted to be connected between the respective first and second sides of the vehicle and the respective first and second axle portions, each of the first and second absorbers including a piston rod provided with a piston for slidingly engaging a cylinder and an actuating chamber containing an actuating liquid formed between the cylinder and the piston;

a pump positioned between the first and second absorbers and adapted to be connected to the vehicle and an axle of the vehicle and comprising a piston with a piston face slidingly engaged within an internal cylinder having a side wall and an end wall that together with the piston face define a pumping chamber;

gas spring means comprising a liquid chamber defined between the internal cylinder and an external cylinder surrounding the internal cylinder and a diaphragm for separating a gas under pressure from the actuating liquid within the liquid chamber; and reservoir means whereby the pump and the reservoir means are connected by respective first and second lines to the actuating chamber of each of the first and second absorbers for controlling the flow of the actuating liquid, wherein the pump and gas spring means are distant and spaced apart from the first and second absorbers and the first and second lines do not communicate with each other.

14. A hydro-pneumatic suspension system adapted to be connected to first and second sides of a vehicle for leveling the vehicle in a side-to-side direction, the system comprising:

first and second absorbers adapted to be connected between the respective first and second sides of the vehicle and the respective first and second axle portions, each of the first and second absorbers including a piston rod provided with a piston for slidingly engaging a cylinder, and an actuating chamber containing an actuating liquid formed between the cylinder and the piston;

a pump positioned between the first and second absorbers and adapted to be connected to the vehicle and the axle of the vehicle, the pump comprising a piston with a piston face slidingly engaged within an internal cylinder having a side wall and an end wall that together with the piston face define a pumping chamber;

a gas spring device comprising a liquid chamber defined between the internal cylinder and an external cylinder surrounding the internal cylinder and a diaphragm for separating a gas under pressure from the actuating liquid within the liquid chamber; and an actuating liquid reservoir, whereby the pump device and the actuating liquid reservoir are connected by respective first and second lines to the actuating chamber of each of the first and second absorbers for controlling the flow of the actuating liquid, wherein the pump and the gas spring device are distinct and spaced apart from the first and second absorbers and the first and second lines do not communicate with each other.

* * * * *